Sept. 9, 1958 R. J. POLLAK 2,850,977
SELF ENERGIZED STABILIZING CONTROL
Filed March 13, 1956 3 Sheets-Sheet 1
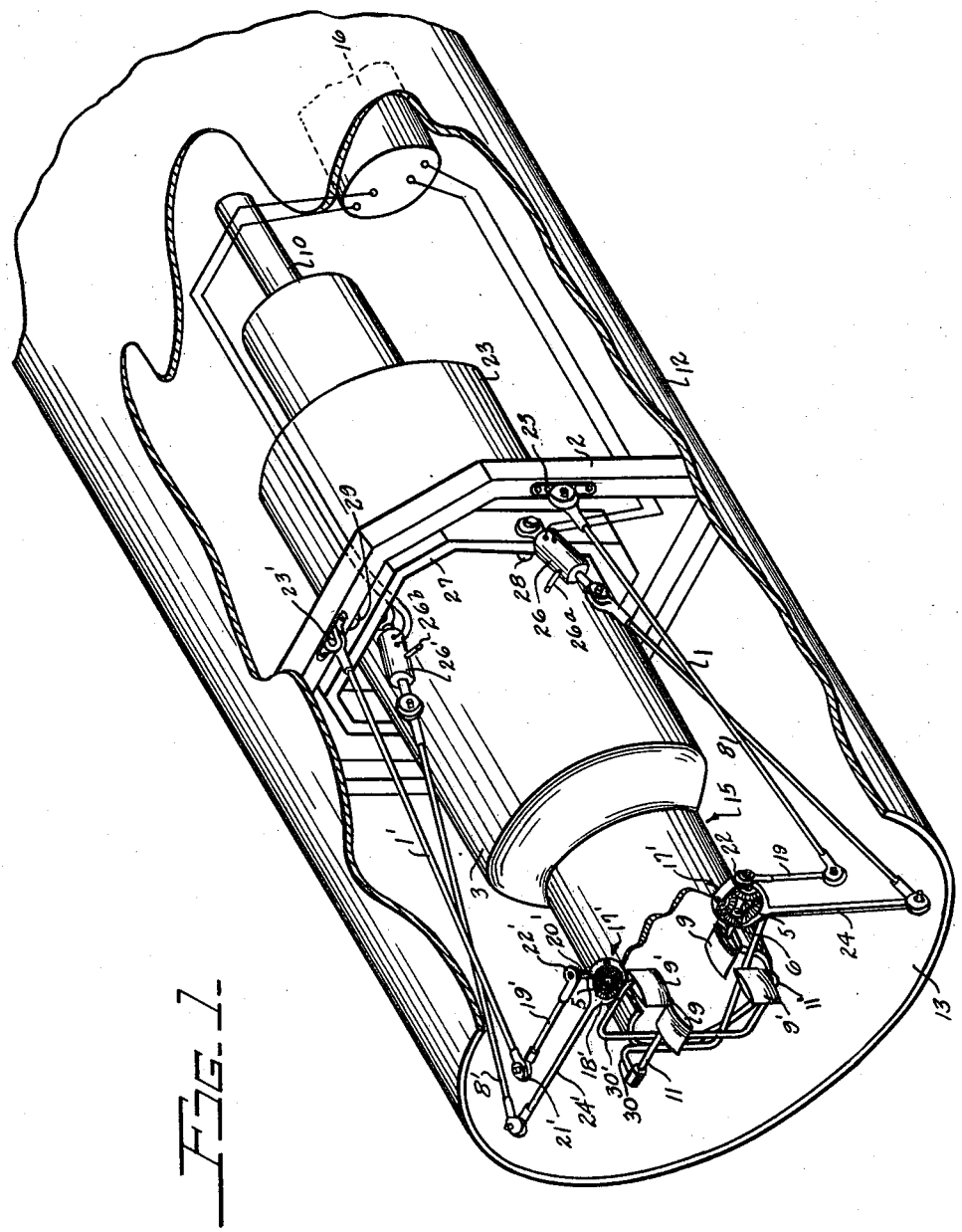
INVENTOR.
RICHARD J. POLLAK
BY
ATTORNEYS

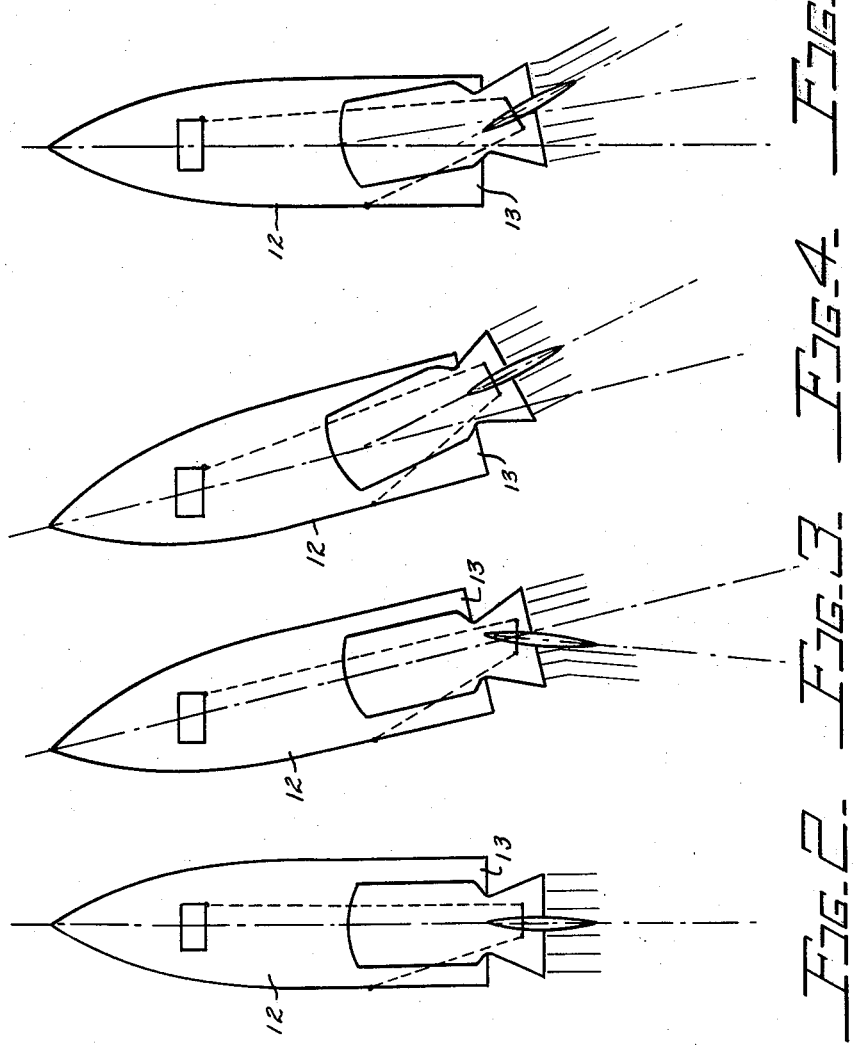

Sept. 9, 1958 R. J. POLLAK 2,850,977
SELF ENERGIZED STABILIZING CONTROL
Filed March 13, 1956 3 Sheets-Sheet 3

INVENTOR.
RICHARD J. POLLAK
BY
ATTORNEYS.

United States Patent Office 2,850,977
Patented Sept. 9, 1958

2,850,977

SELF ENERGIZED STABILIZING CONTROL

Richard J. Pollak, Los Angeles, Calif., assignor to the United States of America as represented by the Secretary of the Air Force Application March 13, 1956, Serial No. 571,358

4 Claims. (Cl. 102—50)

The present invention relates to exhaust actuated stabilizing mechanism and particularly to mechanism in its applications to jet propulsion aircraft in which a propulsion effect is obtained through direct reaction of gases escaping from a propulsion plant and it applies particularly to turbo-jet aircraft, impulse-jet aircraft, athodyds, piston engine aircraft and airscrew-aircraft or airscrew and turbine aircraft with jet exhaust, rockets, etc., said invention being more particularly, but not exclusively, concerned with missiles or aircraft utilizing a rocket motor for propulsion of same.

It is known that the equilibrium and stability in flight of a missile or aircraft of the types described above will be disturbed by uneven burning, misalignment of the body and motor, misalignment of the wings, even strong gusts of wind, etc. When the equilibrium is disturbed, it is imperative, for many reasons, that it be restored immediately. It has been proposed in the prior art to utilize a gimballed power plant in an aircraft in which servo means are utilized to tilt the power plant in transverse directions relative to the flight axis of the aircraft for steering purposes such as disclosed in U. S. Patents 2,621,871, 2,594,766 and 2,396,568; however, it is new and novel to utilize the exhaust gases from the rocket motor for adjusting the axis of the rocket motor to the desired tilt angle relative to the flight axis of the supporting aircraft or missile for stabilizing purposes.

It is accordingly an object of this invention to provide a system of automatically controlling the stability in flight of an aircraft or missile of the types described.

A further object of this invention is to utilize the exhaust gases of the propulsion motor to stabilize the flight of a missile or aircraft.

Another object of this invention is to utilize the exhaust gases of the propulsion motor to so position said propulsion motor as to correct the flight equilibrium of an aircraft or missile.

A further object of this invention is to correct for pitching and yawing of an aircraft or missile during flight thereof by automatically changing the angle of a propulsion motor relative to the flight axis of an aircraft or missile body.

According to another object of this invention, the flight of said aircraft or missile is stabilized by utilizing gyro-operated rotatable fins so positioned in the exhaust gas streams of a movable propulsion motor that adjustment of said fins causes movement of said propulsion motor relative to the aircraft or missile body to automatically correct for disturbances in the equilibrium of the aircraft or missile.

A further object of this invention is to provide in a jet-propelled aircraft or missile a stabilizing apparatus that is convertible from an automatic stabilizing apparatus to one allowing for programing the flight of said aircraft or missile.

At high altitudes where the air density is too low for aerodynamic forces to be effective, the invention is adapted to operate as a control device as well as a stabilizing device and this feature is therefore another object of this invention.

A further object of this invention is the adaptability of the stabilizing apparatus to maintain the angle of attack of a missile such as a jet-propelled vehicle and thereby eliminating many of the operation and stabilization difficulties present.

This invention can be more readily understood by reference to the following description of a preferred embodiment thereof, as illustrated by the accompanying drawings in which, like reference characters refer to like parts in the several figures.

Figure 1 is a view in perspective, the missile shell incorporating the invention being broken away and shown in section.

Figures 2 to 5 show, in four diagrams, how the stability in flight is effected.

Figure 6:
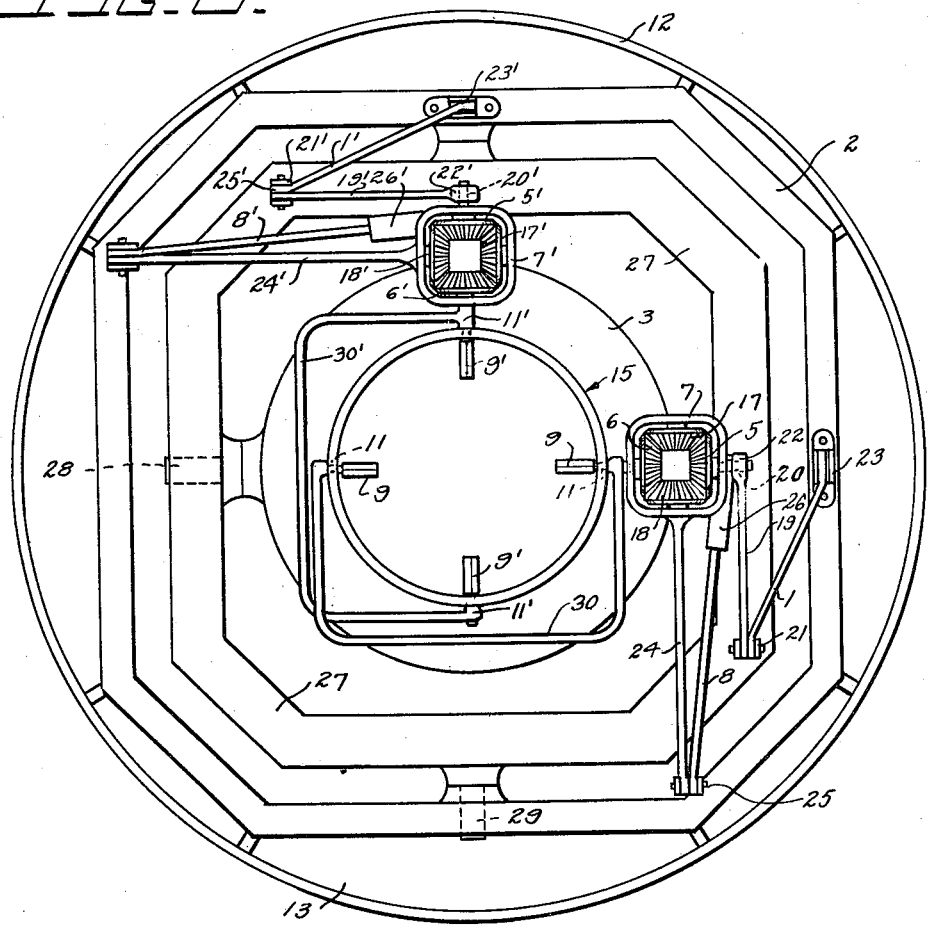
Figure 6 is an enlarged detail end view more clearly showing the differential stabilizing feed back connections.

Reference is made to the drawings in detail particularly Figures 1 and 6, purely as one example, illustrating one application of the invention and not in any degree intended to limit the invention thereby, it being shown in the accompanying drawings as embodied in a jet-propelled missile.

The jet-propelled missile comprises a hollow cylindrical body 12 having one open end 13. A frame 2 is rigidly attached to internal walls of the body 12. A rocket motor 3 is tiltably mounted in said body 12. At 10 said motor 3 is flexibly coupled to said body 12 to allow for tilting movement of said motor 3 relative to the axis of the body 12. This connection supplies fuel and controls to the rocket 3.

The motor 3 is carried by and pivotally mounted at 28 in the gimbal frame or yoke 27 which encompasses said motor 3. Suitable pivots 28, on opposite sides of said motor 3, allow for rocking movement of said motor 3 about its horizontal axis relative to said yoke or gimbal frame 27. The gimbal frame or yoke 27 is pivotally mounted at 29, top and bottom, in fixed frame 2 which encompasses and carries said yoke or frame 27. In this manner said motor 3 is adapted for rocking movements within said frames 27 and 2 relative to said pivots 28 and 29 respectively.

From the above it will be clear that there is provision for a rocking of motor 3 relative to missile body 12 within the yoke 27 about the pivots 28 and a second rocking motion, also relative to missile body 12, within the fixed frame 2 about pivots 29, said second rocking motion being at right angles to the first. The first type of rocking movement may produce or may be produced by "pitching" of the missile body whereas the second may be the result of or may be caused by yawing movements of the body 12.

Two pairs of small fins 9 and 9' are fixed on stub shafts 11 and 11' respectively journaled in the wall 14 of the exhaust nozzle section 15 of the rocket motor 3. One pair of said fins 9—9 are mounted on the shafts 11 along the transverse horizontal axis of the rocket motor 3. Said shafts 11 are connected to operate in unison by the yoke-shaped rod or bail 30 rigidly attached to each of the two fin shafts 11. Said rod 30 straddles the exhaust nozzle section 15 and it attached to said shafts 11 and 11 at points external of said wall 14. The other pair of fins 9'—9' is similarly mounted along the vertical axis of said motor 3 and operate in the same manner the fins 9'—9' being connected by the yoke shaped rod or bail 30', said fins 9 and 9' so mounted, as will hereinafter appear, may be rotated to incline them into the exhaust stream of the motor 3 deflecting it to correct disturbed equilibrium.

A gyro 16 of the type well known in the aircraft art for stabilizing flight may be utilized to provide the stabilized gyroscope control device in fixed relation in space regardless of movement of the missile body 12.

Differential gear trains 17 and 17', of which only gear train 17 will hereinafter be described, as gear train 17' and related elements are similarly constructed, are mounted on the fin shafts 11 and 11' and referred to by the same reference characters except that they are primed. Frame, bracket, or gear casing 7 supports and retains the gears of the differential. A driving gear 5, fixed to stub shaft 20 journaled in frame 7, meshes with and drives bevel gear 18, also journaled in frame 7, and said gear 18 in turn drives gear 6 which is fixed to shaft 11. Stub shaft 20 is actuated by rock shaft arm 19 connected at 22 thereto. Rock shaft arm 19 is pivotally connected at 21 to the pull rod 1 which is pivotally connected at 23 to the fixed frame 2. Should the motor 3 rock on its pivots 28, shafts 11, carrying vanes 9, will be moved to bring the fin surfaces into inclined engagement with the jet stream, forcing the motor 3 to tilt to correct its position or, in other words, to restore its equilibrium. Should the disturbance in equilibrium of the missile be due to angular movement of the missile body 12, the stabilized gyroscope control device 16 will, of course, operate to engage the proper circuits, as, for instance, the circuit including the servo actuator 26. This actuator is flexibly connected to pull rod 8 pivoted at 25 to the differential cage arm 24 fixed to casing 7. Thus, should the displacement be due to relative change in altitude movement of the missile body 12, the gyro actuated control mechanism will come into play, inclining the fins 9 into the exhaust stream and subsequently tilting the body 12 to correct the disturbance.

For yaw, or deviations in a plane at right angles to that above considered, a second pair of fins 9' is used extending into the path of the jet exhaust. Fins 9' are mounted on shafts 11' similar to shafts 11 which are operated by movement of the servo motor 3 and as a result of angular displacement of missile body 12, respectively, just as in the case of fins 9 and by exactly the same kind of pull rod, rock shaft and differential gear mechanism. This operation turns fins 9' in the exhaust stream and thereby tilting the jet motor to correct the yaw, or deviation of the missle, from true course.

The operation of the above-described control for correction of yaw is as follows, particular reference being made to the schematic illustrations in Figures 2 to 5 in which four positions are shown.

Assuming the missile is in flight and its equilibrium is normal, the fins 9 and 9' are in such a position that the faces of the fins are not acted on by the escaping exhaust gases from the nozzle section 15 of the rocket motor 3. This is shown in Figure 2.

Now, if the missile body 12 and rocket motor 3 are caused to deviate or incline to the right without changing their relative positions, one to the other, as illustrated in Figure 3, gyroscope 16 maintains its original position in space, relative to the earth, causing a rotation of the differential gear frame 7' through movement of the pull rod 8' and arm 24' under an impulse from the gyro actuator 26' by a signal from control means 4.

As the differential gear frame 7' rotates, the shafts 11' and fins 9' are rotated to the left, shown in Figure 2. The fins 9' are thus rotated into an inclined position in the exhaust stream of the rocket motor 3 whereby impingement of the exhaust stream upon the surface of the fins 9' deflects the exhaust stream and causes the rocket motor 3 to rotate or tilt to the right about pivots 29 in the direction of the original deviation, as shown in Figure 4. As the rocket motor 3 thus moves, the "follow-up" link 1' connected to the frame 2 at 23' causes operation of differential 17', shafts 11', and fins 9' bringing fins 9' back to their original position so that the exhaust gases will not exert a transverse force on the fins 9', as shown in Figure 4. At this position, Figure 4, the rocket motor 3 ceases to rotate or tilt but is at such an angular position relative to the missile body 12 that the axis of thrust of the rocket motor 3 is inclined more to the right than the inclination of the body 12. The thrust of the rocket motor 3 is thus applied to restore proper relative position of missile body 12, or reestablish equilibrium of the missile.

As the missile body 12 moves left, to its original position, due to the angled exhaust thrust of the rocket motor 3, shown in Figure 5, link "followup" means 1' will cause rotation of the driving gear 5', bevel gear 18', driven gear 6', shafts 11', and fins 9' to the right. Forces produced by the exhaust stream of the rocket motor 3 on the now inclined fins 9' will now cause the rocket motor 3 to rotate about its pivots 29 to the left, back to its original position in Figure 2.

The missile body 12 is now on course and in its original position, as shown in Figure 5. As the rocket motor 3 is rotated back to its original position, it will cause link 1' to effect a rotation of the driving gear 5', bevel gear 18', driven gear 6', shafts 11', and fins 9' to the left such that when the rocket motor 3 is in its original position, as shown in Figure 2, it will cease to rotate about its tilt axis 29 as the fins 9' are now moved into parallel relation with the flow path of the exhaust stream and, therefore, are not affected thereby.

Although it has only been described, as above, how the present invention operates to restore equilibrium when both the missile body 12 and rocket motor 3 are disturbed, it operates just as effectively and in a similar manner to that described to restore equilibrium, when only the rocket motor 3 or the missile body 12 are deviated. The operation of said apparatus for pitching correction is accomplished in a manner similar to that described above.

In order to end automatic stabilization and begin programing, links 8 and 8' are disconnected from the gyro-stabilized platform 4 and are fixed by a pin or pins 26ª and 26ᵇ, or other suitable coupling to the frame 2 and the body 3. This can be effected by mechanical or electrical means. One embodiment of mechanical connection and disconnection could be effected through a spring-loaded pin which when released disconnects the gyro-stabilized platform control means 4 and locks the body 3 relative to the frame 2.

It is to be understood that the invention, of which a single preferred form only has been described and illustrated, is not intended to be limited in scope thereby, as various changes and modifications may be made within the scope of the appended claims.

I claim:

1. In combination in a jet-propelled missile or the like; a missile body; a jet propulsion means movably mounted in said body; two pairs of fins movably mounted in the path of said jet exhaust, said fins individually mounted on stub shafts journaled in the wall of the exhaust nozzle section of said jet propulsion means; a stabilized gyroscope movably mounted in said body; and means connecting said gyroscope to said fins to cause movement of said fins as said missile deviates from true course whereby the flight of said missile is stabilized, two yokes each connecting a pair of stub shafts together so that said each pair of fins operate in unison, said yokes straddling the exhaust nozzle section of the jet propulsion means and connected to the stub shafts at points outside of the wall of the exhaust nozzle section.

2. In combination in a jet-propelled missile or the like; a missile body; a jet propulsion means tiltably mounted in said body for movement in one plane; a plurality of fins movably mounted in the path of said jet exhaust, said fins individually mounted on stub shafts journaled in the exhaust nozzle section of said jet propulsion means; a stabilized gyroscope movably mounted in said body; and means connecting said gyroscope to said fins to cause movement of said fins as said missile deviates from true course to tilt the jet propulsion means relative to the axis of the missile to turn the missile toward said true course whereby the flight of said missile is stabilized; said stub shafts being journaled in aligned pairs with the axes of one pair disposed in perpendicular relation to the axes of the other pair; yokes connecting in pairs two of the said stub shafts together so that said pairs of said shafts will operate in unison independently of the other pair.

3. In a jet-propelled air-craft, a jet motor adapted to produce a jet stream for aircraft propulsion, means for mounting the jet motor on said aircraft for universal tilting movement in two planes at right angles to each other extending through the flight axis of the aircraft such that the axes of the jet stream may be deflected relative to the flight axis of the aircraft to produce righting moments thereon, adjustable control vanes positioned on the jet motor and adapted to be positioned in the jet stream and movable in either direction from a neutral position to produce a corresponding deflection of the jet motor, gyroscope control means on said aircraft for establishing a fixed plane of reference in space with a predetermined orientation of the aircraft and means connected between said control vanes and said gyroscope control means for adjusting said vanes in proportion to variations in attitude between said gyroscope control means and said aircraft for tilting said jet motor to produce a righting moment on the aircraft.

4. In a jet-propelled aircraft, a jet motor adapted to produce a jet stream for aircraft propulsion, means for mounting the jet motor on said aircraft for tilting movement about at least one axis of control of the aircraft, control vanes movably mounted on the jet motor and adapted to be positioned in the jet stream and movable in either direction from a neutral position to produce a corresponding tilting deflection of the motor jet stream for deflecting the direction of the jet stream relative to the flight direction of the aircraft, control means on the aircraft for sensing the departure of the aircraft from a predetermined flight altitude relative to said one axis of control, operating connecting means between said control means for actuating the control vanes in accordance with the magnitude and direction of the aircraft departure as determined by said control means to thereby displace the jet motor to exert a restoring force on the aircraft and a follow up means connected between said aircraft, motor, and said control vanes for restoring the control vanes to the neutral position when the jet motor has been deflected an amount sufficient to produce the requisite restoring force.

References Cited in the file of this patent

UNITED STATES PATENTS

| | | |
|---|---|---|
| 2,165,800 | Koch | July 11, 1939 |
| 2,322,782 | Hemstreet | June 29, 1943 |
| 2,621,871 | Robert | Dec. 16, 1952 |
| 2,644,296 | Sanz | July 7, 1953 |
| 2,654,552 | Jonas | Oct. 6, 1953 |

FOREIGN PATENTS

| | | |
|---|---|---|
| 579,816 | Great Britain | Aug. 16, 1946 |
| 996,656 | France | Sept. 5, 1951 |
| 1,007,694 | France | Feb. 13, 1952 |